US008037480B1

(12) United States Patent
Clark et al.

(10) Patent No.: US 8,037,480 B1
(45) Date of Patent: *Oct. 11, 2011

(54) SYSTEM AND METHOD FOR CREATING THREAD-LEVEL MESSAGE HOOKS

(75) Inventors: Richard Clark, Kirkland, WA (US); Thomas C. Martyn, Woodinville, WA (US)

(73) Assignee: NVIDIA Corporation, Santa Clara, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/945,191

(22) Filed: Nov. 26, 2007

Related U.S. Application Data

(63) Continuation of application No. 10/646,456, filed on Aug. 21, 2003, now Pat. No. 7,328,439.

(51) Int. Cl.
*G06F 15/163* (2006.01)
(52) U.S. Cl. ...................................................... 719/318
(58) Field of Classification Search .................... 719/318
See application file for complete search history.

(56) References Cited

U.S. PATENT DOCUMENTS

| 5,835,090 A * | 11/1998 | Clark et al. ............. 715/764 |
| 6,611,878 B2 * | 8/2003 | De Armas et al. ........... 719/328 |
| 2003/0040889 A1 * | 2/2003 | Coffey et al. ............. 702/188 |
| 2003/0048286 A1 * | 3/2003 | Lal ............................ 345/700 |

OTHER PUBLICATIONS

Teilhet, S., "Subclassing and Hooking with Visual Basic", O'Reilly Media Inc., 1st Ed. (Jun. 15, 2001) [retrieved from http://academic.safaribooksonline.com/0596001185 on Feb. 11, 2011].*
Esposito, D., "Cutting Edge: Windows Hooks in the .NET Framework", MSDN Magazine (Oct. 2002) [retrieved from http://msdn.microsoft.com/en-us/magazine/cc188966.aspx on Feb. 12, 2011].*

* cited by examiner

*Primary Examiner* — H. S. Sough
*Assistant Examiner* — Brian Wathen
(74) *Attorney, Agent, or Firm* — Kilpatrick Townsend & Stockton LLP

(57) ABSTRACT

A first process executing in a computer system creates thread-level message hooks within a second process executing in the computer system. A copy of a global notification hook of the first process is created in the second process. The copy detects a triggering message passed to or from a thread of the second process and determines when and whether to activate a thread-level message hook within the second process; the thread-level message hook is configured to monitor subsequent messages passed to or from the thread of the second process and may take various actions in response to any such messages.

20 Claims, 3 Drawing Sheets

SYSTEM AND METHOD FOR CREATING THREAD-LEVEL MESSAGE HOOKS

CROSS REFERENCE TO RELATED APPLICATIONS

This application is a continuation of application Ser. No. 10/646,456, filed Aug. 21, 2003, entitled "System and Method For Creating Thread-Level Message Hooks," the disclosure of which is incorporated herein by reference for all purposes.

BACKGROUND OF THE INVENTION

The invention relates generally to detection of messages exchanged between processes in a computer system and in particular to creating thread-level message hooks for detecting messages exchanged with a specific process or thread.

Modern operating systems, such as recent versions of the Microsoft Windows operating system, are "multitasking," meaning that they generally execute a number of processes in parallel. For example, in Windows XP, it is typical for two or three dozen processes (or more) to be executing at a given time. These processes usually include numerous operating system processes, device drivers, and the like, as well as "application" processes, such as video games, World Wide Web browsers, e-mail or instant messaging clients, and other programs that are not integrated into the operating system. Application processes typically interact with the operating system by exchanging messages with operating system processes. For instance, when a Web browser process creates a new window for displaying a Web page, the browser process usually sends a message to the operating system requesting a new window; the operating system responds with another message when the window is created. User input, such as keystrokes or mouse clicks, is usually received by the operating system, which responds by sending messages to one or more application processes.

A typical message flow for a conventional computer system is shown in FIG. 1A, with circled numbers next to the arrows indicating a typical sequence of message transmissions. An operating system (OS) 102 is represented as a single process, although in practice, the OS may include any number of processes that may exchange messages with each other and/or with application processes. Two application processes 104 are shown, and each process has its own message queue 108 for temporarily storing messages received from OS 102. (Herein, multiple instances of like objects are denoted with reference numbers identifying the object and parenthetical numbers identifying the instance where appropriate.) Each application process 104 retrieves messages sequentially from its queue 108 and takes appropriate action in response to each message. In some instances, the action may include generating a message to the OS, which can also be queued in the application's message queue 108. Message queues 108 enable asynchronous operation of OS 102 and application processes 104. For instance, OS 102 can generate a message for application process 104(1), place it in queue 108(1), and proceed to another activity without waiting for application process 104(1) to receive or respond to the message. Similarly, process 104(1) can generate a message for OS 102, place it in queue 108(1) and proceed without waiting for a response.

FIG. 1A shows that a separate message queue 108 may be provided for each application process 104. This allows processes to operate independently of each other; for example, application process 104(2) can receive and process any messages in its queue even if application process 104(1) stalls or crashes. While this configuration has many advantages, it is generally not possible for one application process to detect messages exchanged between the OS and another application process. For instance, in FIG. 1A, application process 104(2) cannot detect messages in queue 108(1). Thus, application process 104(2) cannot reliably detect when an event (such as a window being created or destroyed) occurs in process 104(1).

Many applications do not require such information, but there are various kinds of applications for which knowledge of events occurring in other processes is desirable or necessary. One example is a "desktop manager" application that provides enhanced user control of the graphical desktop. A desktop manager typically supports functionality such as displaying the desktop across multiple display screens (with the ability to drag windows from one screen to another) or making windows appear transparent or translucent on demand, and may also support various customizations and esthetic effects, e.g., animations or skins. In order to create the appropriate effects, the desktop manager generally needs to know when another application's windows are being created, moved, or destroyed.

To enable one process (e.g., a desktop manager) to detect messages exchanged with other processes, some operating systems provide global system message hooks. A global system message hook intercepts all messages (or selected messages) between the OS and any application program, thereby enabling a hook procedure to act on the message. In some instances, the hook procedure may alter the message or prevent delivery of the message to the recipient process. Message flow in a conventional computer system with a global system message hook is illustrated in FIG. 1B, with circled numbers again indicating an order of message transmissions. When OS 102 generates a message to application process 104(1), it sends the message first to a hook procedure 110. Hook procedure 110, which is typically supplied by an application programmer, performs its programmed function(s) and returns a result to OS 102. The result may include the original message or an altered version of the message to be forwarded to application process 104(1), or an instruction to OS 102 not to deliver the message to application process 104(1). Where the hook procedure does not block message delivery, OS 102 places the message into a systemwide message queue 112 from which it is retrieved by the appropriate application process, in this case process 104(1). In this implementation, when a global system message hook is present, process-specific queues 108 (shown in FIG. 1A) are not used; they are replaced by systemwide message queue 112.

It should be noted that, although the global system message hook of FIG. 1B is able to detect messages related to any application that may be executing, it also has significant disadvantages for system performance. First, messages for all application programs must be processed by the hook procedure before they are delivered, even though the programmer of the hook procedure may only be interested in messages related to certain application programs. Second, if the hook procedure freezes or crashes, other applications generally also freeze or crash since they are unable to receive messages. Third, all messages are serialized in a single systemwide message queue 112, and applications contend with each other for access; a stalled application can block access by other applications. Such considerations have led some operating system vendors to recommend that developers limit their use of global system message hooks.

As an alternative approach to monitoring messages, some operating systems support "thread-level" message hooks.

These hooks are installed within a process (or a thread if the OS supports multi-threaded processes) and affect only that process or thread. An example is shown in FIG. 1C, where a thread-level message hook has been installed for application process 104(2) but not for application process 104(1); again, the circled numbers next to the arrows indicate an order of message transmissions that may occur. Messages from OS 102 to process 104(2) are first sent to a thread-level hook procedure 114(2), which returns a result to OS 102. The message is then added to thread-specific message queue 108(2), from which application process 104(2) retrieves the message. Messages from OS 102 to process 104(1) are not sent to thread-level hook procedure 114(2); instead, they are sent directly to the thread-specific queue 108(1) for application process 104(1). A separate thread-level hook procedure (not shown) could be installed for application process 104(2) if desired. While this configuration is more robust than the global system message hook configuration of FIG. 1B, it does not enable application process 104(1) to detect messages that may be directed to or from application process 104(2) because thread-level hook procedure 114 is effectively internal to application process 104(2) and does not communicate with application process 104(1).

Some operating systems, such as Microsoft Windows, support computer-based training by enabling one application to be notified when another application starts or stops. This can be implemented using a "global notification hook," which generally includes a hook procedure that receives selected messages for all application processes (such as start and stop messages) but is not in the message path between the OS and any application process. An example of message flows in a computer system with a global notification hook is shown in FIG. 1D, with circled numbers indicating an order of message transmissions that may occur; circled numbers followed by letters indicate message transmissions that may occur in parallel. An OS 102 transmits a message to an application process (or thread) 104(1) by placing the message in a process-specific (or thread-specific) message queue 108(1) for process 104(1); process 104(1) retrieves the message from queue 108(1). In parallel with placing the message in queue 108(1), OS 102 transmits the message to a global notification hook procedure 118. Similarly, OS 102 can transmit a message to a different application process 104(2) by placing the message in a process-specific queue 108(2) for process 104(2) and, in parallel, transmitting the message to global notification hook procedure 110. Thus, global notification hook procedure 110 may receive messages for all processes without being in the message path between the OS and any application process.

Since the global notification hook procedure 118 is not in the message path, some features associated with message hooks are absent. For instance, a global notification hook cannot modify a message or block transmission of the message. In the context of a desktop management program, these features are sometimes useful, and a global notification hook does not provide them. Thus, existing desktop management programs rely on global system message hooks despite their drawbacks.

It would, therefore, be desirable to provide a way for a first process in a multitasking system to interact with a second process without the disadvantages of a global system message hook.

BRIEF SUMMARY OF THE INVENTION

Embodiments of the present invention provide methods and systems by which a first process creates thread-level message hooks within a second process. A global notification hook of the first process detects selected messages to and/or from the second process and, in response to the detected messages, determines when and whether to activate a thread-level message hook within the second process. The thread-level message hook may be located in the message path of one or more threads of the second process but is not in the message path of processes other than the second process.

According to one aspect of the invention a method is provided for use by a first process executing in a computer system for interacting with a second process executing in the computer system. During a startup sequence of the second process, a copy of a global notification hook of the first process is created in the second process. Using the copy of the global notification hook, an occurrence of a triggering message passed between an operating system and a thread of the second process is detected. In some embodiments, the triggering message is a window creation message. In response to detecting the occurrence of the triggering message, it is determined whether subsequent messages passed between the operating system and the thread of the second process should be monitored. In the event that subsequent messages should be monitored, a thread-level message hook is activated within the thread of the second process, wherein the thread-level message hook is configured to monitor the subsequent messages. In some embodiments, the thread-level message hook may be further configured to cause an action to occur in response to a specified subsequent message. For instance, the action may include creating a visual effect for a window of the second process.

According to another aspect of the invention, a method is provided for use by a first process executing in a computer system for interacting with a second process executing in the computer system. During a startup sequence of the first process, a copy of a global notification hook of the first process is created in the second process. A private startup message is broadcast from the first process to the copy of the global notification hook. In response to the private startup message, the copy of the global notification hook determines whether subsequent messages passed between the operating system and a thread of the second process should be monitored and, in the event that subsequent messages should be monitored, activates a thread-level message hook within the thread of the second process, wherein the thread-level message hook is configured to monitor subsequent messages.

The following detailed description together with the accompanying drawings will provide a better understanding of the nature and advantages of the present invention.

DETAILED DESCRIPTION OF THE INVENTION

Embodiments of the present invention provide methods and systems by which a first process creates thread-level message hooks within a second process. A global notification hook of the first process detects selected messages to and/or from a thread of the second process and, in response to the detected messages, determines when and whether to activate a thread-level message hook within that thread of the second process. As used herein, the term "process" focuses on memory mapping, address space, and scope of an executing application; the term "thread" refers to a stream of instructions within the application. In some embodiments, a process may include multiple threads; for instance, an application, such as a Web browser, may be executed as a process, and each window that the application opens may be operated as a different thread of that process. In such embodiments, a "thread-level" message hook may be activated or not on a per-thread basis. In other embodiments, processes may be single-threaded. Those of ordinary skill in the art will appreciate that the implementation of a thread-level message hook is generally dependent on the operating system configuration, and the present invention is compatible with a variety of operating system configurations.

Figure 2:
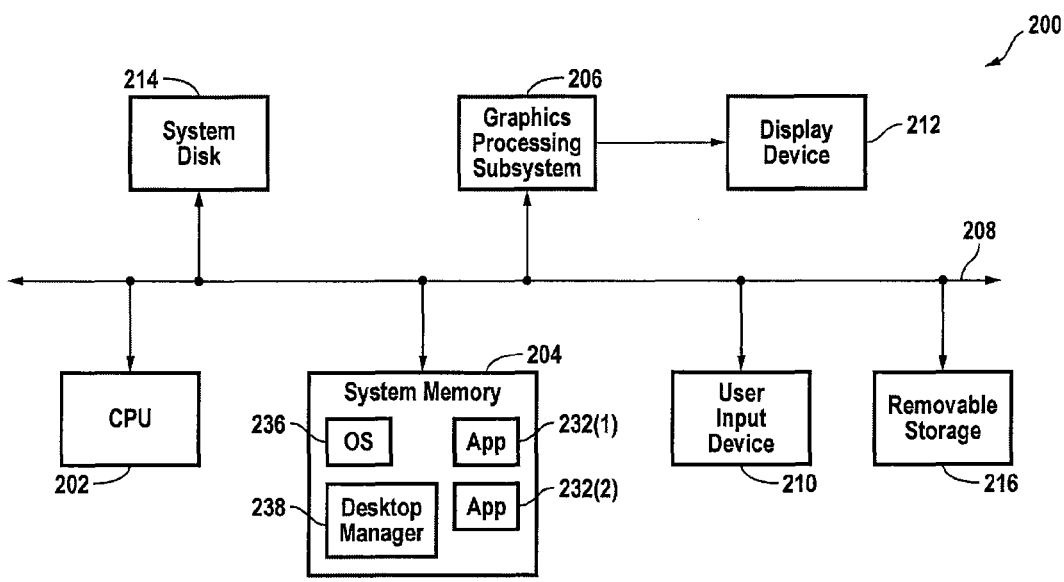
FIG. 2 is a simplified block diagram of a computer system according to an embodiment of the present invention.

FIG. 2 is a simplified block diagram of a computer system 200, such as a personal computer, according to an embodiment of the present invention. Computer system 200 includes a central processing unit (CPU) 202, a main system memory 204, a graphics processing subsystem 206, and one or more user input devices 210 communicating via a bus 208, as well as a display device 212 controlled by graphics processing subsystem 206. Computer system 200 may also include other components, such as a system disk 214 and/or one or more removable storage devices 216 supporting various storage media including floppy disk, compact disk (CD), digital video disk (DVD), magnetic tape, etc.

CPU 202 executes various application programs 232 (e.g., word processing programs, video game programs, World Wide Web browser programs, etc.), as well as a window-based operating system (OS) 236 (e.g., Microsoft Windows) that supports the application programs. (As above, multiple instances of like objects are denoted with reference numbers identifying the object and parenthetical numbers identifying the instance where needed.) In this embodiment, CPU 202 also executes a desktop management program 238 that provides desktop enhancements, such as the nView™ software package sold by NVIDIA Corporation, assignee of the present application. In one embodiment, these enhancements may include window transparency (or translucence), visual effects such as fade-in or fade-out of windows, "skins" (i.e., modifications to the look and feel of graphical user interface elements such as icon shapes and colors, menu colors and fonts, etc.), features related to multiple-screen display systems (e.g., preventing a window from being split across two display screens), and the like. A variety of desktop enhancement features may be implemented, and a detailed description is omitted as not being crucial to understanding the present invention.

It is to be understood that, although the various programs are shown as residing in system memory 204, the invention is not limited to any particular mechanism for supplying program instructions for execution by CPU 202. For instance, at any given time some or all of the program instructions for any of these programs may be present within CPU 202 (e.g., in an on chip instruction cache and/or various buffers and registers), in a page file or memory mapped file on system disk 214, and/or in other storage space. In the course of executing each program, CPU 202 generally creates a process (which may have one or more threads), and multiple processes or threads may be executed in parallel by CPU 202 using conventional process management techniques.

In one embodiment, the operating system (OS) 236 includes an application program interface (API) that an application program 232 may use to invoke various operating system services such as opening, closing, and repositioning of the application's windows. OS 236 may also include a user interface, or shell, for processing user input. During operation, application programs 232 exchange various messages with OS 236. For example, user input (e.g., a keystroke or mouse click) is normally received first by the operating system shell, which may send the input (or another message related to the input) to one or more applications 232, depending on the particular input and the current context (e.g., which window is active when the input is received). An application 232 receives the message and, in the course of processing the input, may respond to the operating system with messages of its own.

According to an embodiment of the present invention, desktop management program 238 detects some or all of these messages and, when appropriate, activates thread-level message hooks in a thread of a process executing a particular application program 232. Specific examples of techniques for detecting messages and activating thread-level message hooks are described below. When active, a thread-level message hook may cause various actions to occur in response to messages exchanged between its application process (or thread) and the operating system, such as turning a window transparent during a move operation.

It will be appreciated that the system described herein is illustrative and that variations and modifications are possible. In one embodiment, the hardware components of computer system 200 are of generally conventional design and may include standard components such as monitors, keyboards, disk drives, CD-ROM drives, network interface components, and the like. Computer system 200 can be configured with many different hardware components and can be made in many dimensions and styles (e.g., laptop, tablet PC, personal digital assistant, server, workstation, mainframe) and configured with a multitasking operating system.

Embodiments of methods for installing thread-level message hooks that can be implemented in desktop management program 238 will now be described. In one such embodiment, desktop management program 238 controls the installation of thread-level message hooks by using a global notification hook, which generally includes a hook procedure that receives selected (or all) messages for all application processes but is not in the message path between the OS and any application process. It should be noted that the global notification hook need not receive all messages from all processes. For example, in one implementation, the global notification hook only receives messages related to creation and destruction of windows.

Figure 3:
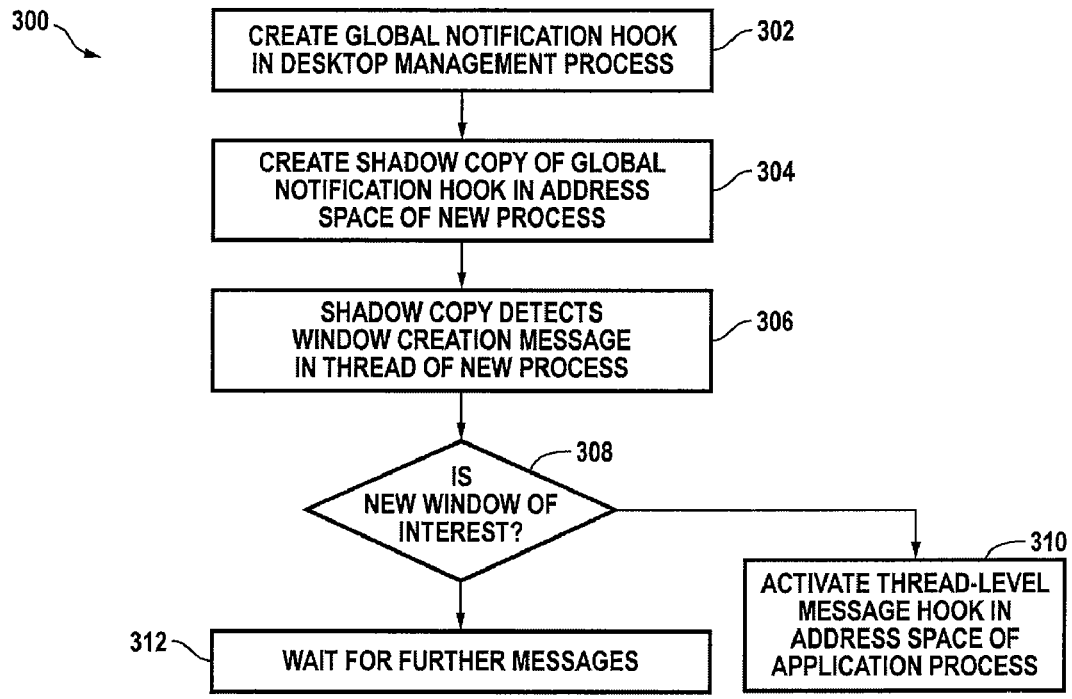
FIG. 3 is a flow diagram of a process for installing a thread-level message hook according to an embodiment of the present invention.

FIG. 3 is a flow diagram of a process 300 that can be used by a desktop management program to install and activate a thread-level message hook in a thread of an application process. In process 300, the desktop management program includes a global notification hook, and an application process is initialized while the desktop management program is running. The hook procedure of the global notification hook controls activation (and in some embodiments installation) of a thread-level message hook.

More specifically, at step 302, a global notification hook is created in the address space of the desktop management program. In one embodiment using the Microsoft Windows operating system, the global notification hook is created as a "CBT" (for computer-based training) hook. At step 304, when an application process starts, a shadow copy of the global notification hook is created in the address space of the new process. Where the global notification hook is implemented as a CBT hook, the Microsoft Windows operating system automatically creates the shadow copy when any new process is created.

At step 306, the shadow copy of the global notification hook detects a message (or sequence of messages) indicating that a window is being created in a thread of the application process. In one embodiment, the "WM_CREATE" message used in Microsoft Windows is detected. Detection of the window creation message activates a global notification hook procedure that determines (step 308) whether the new window is of interest to the desktop management program.

Numerous criteria may be applied for determining whether a window is of interest. In one embodiment, all windows are considered to be of interest to the desktop management program unless they fit into a specific category of excluded windows. For example, one excluded category may include non-visible windows (e.g., various windows associated with system support functionality that never appear on the desktop), since there is no need to apply visual effects to such windows. Some visible windows may also be excluded. For example, the desktop management program may include a user interface module via which the user can exclude certain windows (or types of windows) from being affected by the desktop management program. In one embodiment, designations of windows to be excluded can be made on the basis of the application (e.g., excluding windows created by a Web browser program or screen saver) and/or window type (e.g., a dialog box). In addition or alternatively, the application programmer may provide the desktop management program with a list of window types that are incompatible with its operations (e.g., windows known to cause applications to crash when effects are applied); windows on such a list also would be excluded. Windows associated with critical performance applications, such as computer-aided design (CAD) or 3-D game programs, may also be excluded in order to maximize performance of such programs. In an alternative embodiment, only windows specifically identified (e.g., by a user or programmer selection) as being of interest are identified as such at step 308.

If the window is of interest, the global notification hook procedure activates a thread-level message hook in the thread of the application process. In some embodiments, activating a thread-level message hook includes creating a copy of executable program code for the thread-level message hook in the address space of the application process. In other embodiments, the copy of the program code is created at an earlier time (e.g., during step 304) and activation involves changing the state of the thread such that the thread-level message hook code is executed.

Figure 1A:
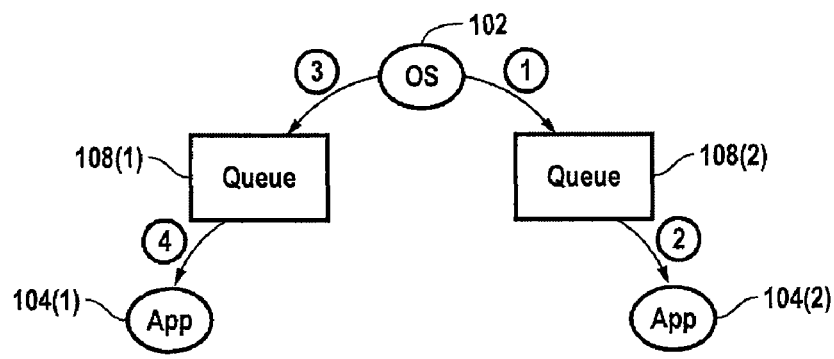
FIG. 1A is an illustration of a message flow in a conventional computer system.
Figure 1B:
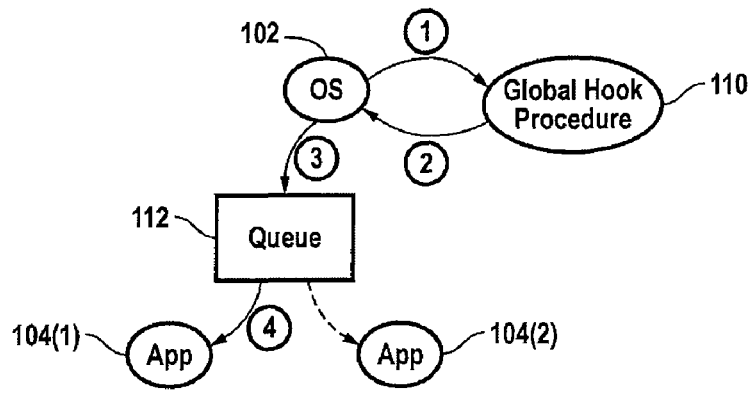
FIG. 1B is an illustration of a message flow in a conventional computer system with a global system message hook.
Figure 1C:
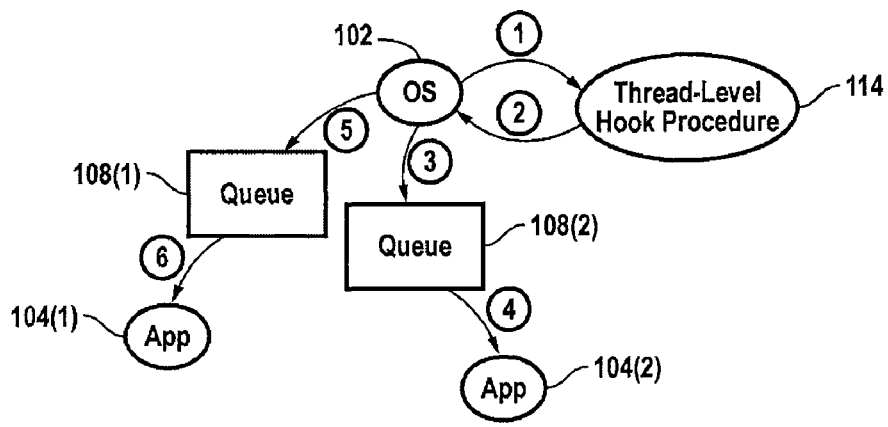
FIG. 1C is an illustration of message flows in a conventional computer system with a thread-level message hook.
Figure 1D:
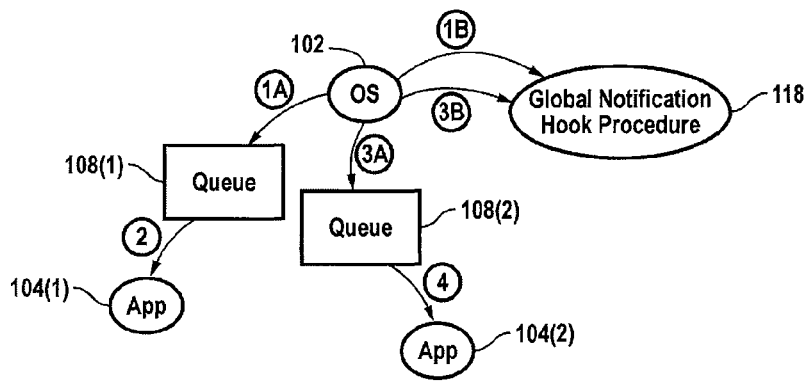
FIG. 1D is an illustration of message flows in a conventional computer system with a global notification hook.

As described above with regard to FIG. 1C, a thread-level message hook intercepts only messages directed to (or from) the thread in which the hook operates, leaving other threads unaffected. The thread-level message hook activated at step 310 may include one or more hook procedures that are invoked in response to various messages between a particular thread and the OS; one example is a hook procedure that turns a window transparent in the event that a "move" message is detected. A wide variety of functions may be implemented using thread-level hook procedures; numerous examples are known in the art, and a detailed description is omitted as not being critical to understanding the present invention.

At step 312, regardless of whether the window was determined to be of interest at step 308, the shadow copy of the global notification hook waits for further messages (e.g., another window creation message). In some embodiments, the global notification hook also detects window destruction messages and may respond, e.g., by deactivating the thread-level message hook or uninstalling the thread-level message hook (i.e., removing the thread-level message hook code from the application process's address space). In other embodiments, messages other than window creation and destruction may be detected by the global notification hook and used to trigger the activation or deactivation of a thread-level message hook; any message that can be detected using a global notification hook may be used as a triggering message.

Figure 4:
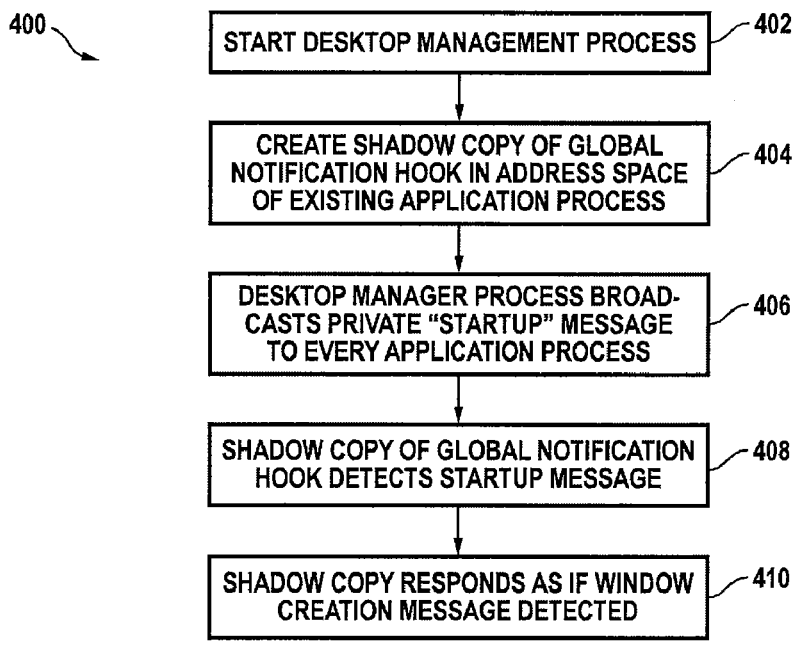
FIG. 4 is a flow diagram of another process for installing a thread-level message hook according to an embodiment of the present invention.

As noted above, in process 300 the application process is created at a time when the desktop management program is already executing. In some embodiments, the desktop management program may be started while a previously-started application program is executing and may activate thread-level message hooks in such programs. For example, FIG. 4 is a flow diagram of a process 400 by which a desktop management program is able to create thread-level message hooks in threads of application processes that were created before execution of the desktop management program begins. At step 402, a desktop management process is initialized. At step 404, a shadow copy of the global notification hook is created in the address space of each existing processes; where the global notification hook is implemented as a CBT hook in Microsoft Windows, the operating system automatically performs step 404 during initialization of the desktop management process.

At step 406, the desktop management process broadcasts a private "startup" message to every application process. The startup message is a message recognizable by the global notification hook. In one implementation using Microsoft Windows, the startup message is sent using the "WM_SYSTEM" message with a parameter value that is not one of the pre-defined values in the operating system. The global notification hook is programmed to recognize this parameter value as signaling a startup message from the desktop management program. At step 408, the shadow copy of the global notification hook in an application process detects the startup message, and at step 410, the shadow copy responds to the startup message as it would to a window creation message, e.g., by executing steps 308, 310, 312 of process 300 to activate a thread-level message hook.

Similarly, when the desktop management process exits, it may broadcast a private "shutdown" message to existing application processes; the shadow copy of the global notification hook in an application process receives the shutdown message and responds as it would to a window destruction message, e.g., by deactivating a thread-level message hook.

It will be appreciated that the processes described herein are illustrative and that variations and modifications are possible. Steps described as sequential may be executed in parallel, order of steps may be varied, and steps may be modified or combined. In alternative embodiments, messages other than window creation may trigger the decision whether to install or activate a thread-level message hook in a particular application process or thread, and multiple thread-level message hooks may co-exist, with various ones of the thread level message hooks being activated or deactivated in response to various messages. The decision whether to activate a thread-level message hook may be based on various criteria; in some instances, all occurrences of a triggering message may cause the thread-level message hook to be activated, while in other cases activation may be conditional and may depend on criteria related to window type or other attributes of the process that receives (or sends) the triggering message.

In one embodiment, the desktop management program includes one or more program code modules that can be installed on a computer system such as system 200 of FIG. 2. The program code modules may include one module implementing the global notification hook procedure and another module (or modules) implementing the thread-level message hook procedure(s). Computer programs incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks including the Internet. Computer readable media encoded with the program code may be packaged with a compatible device or provided separately from other devices (e.g., via Internet download).

While the invention has been described with respect to specific embodiments, one skilled in the art will recognize that numerous modifications are possible. For instance, while the description above refers to a desktop management program or process, similar techniques may also be employed for other types of programs or processes to support detection of messages exchanged between other processes and an operating system; accordingly, any program or process that needs to monitor the state of a window (or other resource) owned by another process may advantageously employ an embodiment of the invention. The techniques described herein may also be adapted to detect messages exchanged between operating system processes in addition to (or instead of) detecting messages exchanged with application processes. Thus, embodiments of the present invention may be used in a variety of situations in which a first process affects a second process based on the occurrence of a particular message to the second process from the operating system or vice versa.

While the description refers in various places to the Microsoft Windows operating system by way of example, it will be appreciated that the techniques described herein are not limited to any particular operating system and may be adapted to any multitasking operating system that supports a global notification hook and a local (thread-level) message hook having the features described herein, regardless of particular terminology that may be used for a given operating system.

Thus, although the invention has been described with respect to specific embodiments, it will be appreciated that the invention is intended to cover all modifications and equivalents within the scope of the following claims.

What is claimed is:

1. A method for use by a first process executing in a computer system for interacting with a second process executing in the computer system, the method comprising:
    during a startup sequence of the second process, creating a copy of a global notification hook of the first process in the second process;
    using the copy of the global notification hook, detecting an occurrence of a triggering message passed between an operating system and a thread of the second process;
    in response to detecting the occurrence of the triggering message, determining whether subsequent messages passed between the operating system and the thread of the second process should be monitored; and
    in the event that the subsequent messages should be monitored, activating a thread-level message hook within the thread of the second process, wherein the thread-level message hook is configured to monitor the subsequent messages, wherein the thread-level message hook is further configured to cause an action to occur in response to a specified subsequent message.

2. The method of claim 1, wherein the action includes creating a visual effect for a window of the second process.

3. The method of claim 1, wherein the thread-level message hook is configured so as not to affect operation of a third process executing concurrently with the second process in the computer system.

4. The method of claim 1, wherein the triggering message is a window creation message.

5. The method of claim 4, wherein the act of determining whether subsequent messages should be monitored includes determining whether the window creation message relates to a window of interest.

6. The method of claim 5, wherein the window creation message relates to a window of interest unless one or more of the following conditions obtains: (a) the window creation message does not relate to a visible window; (b) the created window has a window type designated by a user as not being of interest; and (c) the created window has a window type that is incompatible with the thread-level message hook.

7. The method of claim 1, wherein the first process is a desktop management process.

8. The method of claim 7, wherein the second process is an application process.

9. The method of claim 1, wherein the act of activating the thread-level message hook includes mapping executable code for the thread-level message hook into an address space of the second process.

10. The method of claim 1, wherein the act of creating the copy of the global notification hook includes mapping executable code for the global notification hook into an address space of the second process.

11. The method of claim 1, wherein the act of detecting the occurrence of the triggering message includes receiving message data of the triggering message.

12. The method of claim 11, wherein the message data of the triggering message is provided to the copy of the global notification hook concurrently with a transmission of the triggering message to the thread of the second process.

13. A computer program product stored on a non-transitory computer-readable storage medium for use by a first process executing in a computer system for interacting with a second process executing in the computer system, the computer program product comprising:
    program code for creating a copy of a global notification hook of the first process in the second process during a startup sequence of the second process;
    program code for detecting an occurrence of a triggering message in the second process;
    program code for determining, in response to detecting the occurrence of the triggering message, whether subsequent messages passed between the operating system and a thread of the second process should be monitored; and
    program code for activating a thread-level message hook within the thread of the second process in the event that the subsequent messages should be monitored, wherein the thread-level message hook is configured to monitor the subsequent messages, wherein the thread-level message hook is further configured to cause an action to occur in response to a specified subsequent message.

14. The computer program product of claim 13, wherein the non-transitory computer-readable storage medium comprises a magnetic storage medium.

15. The computer program product of claim 13, wherein the non-transitory computer-readable storage medium comprises an optical storage medium.

16. A computer system for use by a first process executing in the computer system for interacting with a second process executing in the computer system, the computer system comprising:
   a processor configured to create a copy of a global notification hook of the first process in the second process, during a startup sequence of the second process; and
   a memory coupled to the processor, the memory configured to store a plurality of code modules which when executed by the processor cause the processor to:
   using the copy of the global notification hook, detect an occurrence of a triggering message passed between an operating system and a thread of the second process;
   in response to detecting the occurrence of the triggering message, determine whether subsequent messages passed between the operating system and the thread of the second process should be monitored; and
   in the event that the subsequent messages should be monitored, activate a thread-level message hook within the thread of the second process, wherein the thread-level message hook is configured to monitor the subsequent messages, wherein the thread-level message hook is further configured to cause an action to occur in response to a specified subsequent message.

17. The computer system of claim 16, wherein the action includes creating a visual effect for a window of the second process.

18. The computer system of claim 16, wherein the thread-level message hook is configured so as not to affect operation of a third process executing concurrently with the second process in the computer system.

19. The computer system of claim 16, wherein the act of activating the thread-level message hook includes mapping executable code for the thread-level message hook into an address space of the second process.

20. The computer system of claim 16, wherein the act of creating the copy of the global notification hook includes mapping executable code for the global notification hook into an address space of the second process.

* * * * *